United States Patent Office 2,782,222
Patented Feb. 19, 1957

2,782,222
PRODUCTION OF TEREPHTHALIC ACID OR ESTERS THEREOF

Dennis Thompson, Norton-on-Tees, England, assignor to Imperial Chemical Industries Limited, a corporation of Great Britain No Drawing. Application March 29, 1954, Serial No. 419,576

Claims priority, application Great Britain May 1, 1953

10 Claims. (Cl. 260—475)

This invention relates to the production of terephthalic acid or esters thereof.

It has already been proposed to convert dialkyl cyclohexadiene-1,4-dicarboxylates into dialkyl terephthalates by contacting them with a dehydrogenation catalyst under suitable conditions. For example they may be contacted in the liquid or vapor phase with a catalyst comprising a metal of group VIII of the periodic system, or copper, or an oxide of chromium, molybdenum or vanadium.

It has also been proposed to convert dialkyl cyclohexadiene-1,4-dicarboxylates into dialkyl terephthalates by the use of chemical reagents instead of dehydrogenation catalysts. For example the conversion may be brought about by the use of lead tetra-acetate, sulphur, selenium or chloranil.

It has been further proposed to carry out the conversion by thermal methods; for example the dialkyl cyclohexadiene-1,4-dicarboxylates may be contacted with an inert mass, such as silica gel, maintained at an elevated temperature.

The present invention provides an improved process for the conversion of cyclohexadiene-1,4-dicarboxylic acids or acid esters or di-esters thereof to terephthalic acid or acid esters or di-esters thereof.

Cyclohexadiene-1,4-dicarboxylic acids or acid esters or di-esters thereof, the starting materials of this invention, may be obtained in the manner described in copending applications Serial No. 419,578 and Serial No. 419,600, filed on even date herewith.

Thus, according to the present invention there is provided a process for the production of terephthalic acid or acid esters or di-esters thereof which comprises the step of treating a cyclohexadiene-1,4-dicarboxylic acid or an acid ester or di-ester thereof, maintained at a temperature of 50° to 300° C., with a gas containing free oxygen.

The process of the present invention is preferably carried out at a temperature of at least 100° C. In particular it is preferable to operate within the temperature range of 150° to 300° C.

The process is conveniently carried out by passing a gas containing free oxygen through the cyclohexadiene-1,4-dicarboxylic acid or acid ester or di-ester thereof maintained at a suitable elevated temperature. The gas employed may be substantially pure oxygen or it may be oxygen in admixture with inert diluents. A convenient gas for use in the process of the present invention is air.

The process may be carried out in the absence of catalysts, but on the other hand, if desired, oxidation catalysts may be employed. Suitable catalysts comprise soluble salts of metals such as cobalt, manganese, iron, nickel and copper. In particular it is preferred to employ naphthenates as the oxidation catalysts. For example, .001 to 1% by weight of cobalt naphthenate may be added to the cyclohexadiene-1,4-dicarboxylic acid or acid ester or di-ester thereof prior to treating this substance with a gas containing free oxygen at an elevated temperature. In a preferred embodiment of the process of the present invention, a dimethyl ester of a cyclohexadiene-1,4-dicarboxylic acid, and, in particular, the dimethyl ester of cyclohexa-1,4-diene-1,4-dicarboxylic acid may be converted to dimethyl terephthalate by passing air through the dimethyl ester while this is maintained at an elevated temperature in the range of 150° to 300° C.; the reaction may be carried out in the absence of added catalysts or in the presence of an oxidation catalyst as hereinbefore defined, cobalt naphthenate being particularly suitable.

The oxidation of cyclohexadiene-1,4-dicarboxylic acid or acid ester or di-ester thereof may be carried out in the presence of a suitable solvent; solvents which may be employed are, for example, octanoic acid, caprylic acid and glacial acetic acid.

EXAMPLE 1

3 grams of the dimethyl ester of cyclohexa-1,4-diene-1,4-dicarboxylic acid and 0.1 gram of cobalt naphthenate were dissolved in 60 mls. of caprylic acid. Air was bubbled through the mixture which was maintained at 150° C. for 12 hours. On analysis at the end of this time, it was found that substantially all of the dimethyl ester had been oxidised to dimethyl terephthalate.

EXAMPLE 2

3 grams of the dimethyl ester of cyclohexa-1,4-diene-1,4-dicarboxylic acid were dissolved in 100 mls. of octanoic acid. Air was bubbled through the mixture, which was maintained at a temperature of 150° C. for 12 hours. At the end of this time it was found that 88% of the dimethyl ester had been converted to dimethyl terephthalate.

I claim:

1. A process for the production of 1,4-benzene derivative having a formula: $C_6H_4(COOX)_2$ in which X is lower alkyl which comprises the step of treating 1,4-cyclohexadiene derivatives having a formula:

$$C_6H_6(COOX)_2$$

at a temperature of 50° to 300° C. by passing a gas containing free oxygen therethrough.

2. A process as claimed in claim 1 in which the temperature of operation is at least 100° C.

3. A process as claimed in claim 1 in which the temperature of operation is 150° to 300° C.

4. A process as claimed in claim 1 in which the gas comprising free oxygen is air.

5. A process as claimed in claim 1 wherein said treatment is carried out in the presence of an oxidation catalyst comprising a soluble salt of a metal selected from the group consisting of cobalt, manganese, iron, nickel and copper.

6. A process as claimed in claim 5 in which the catalyst is a naphthenate.

7. A process as claimed in claim 5 in which the catalyst is a cobalt naphthenate.

8. A process as claimed in claim 5 in which the catalyst is present in an amount of .001 to 1% by weight based on the weight of 1,4-cyclohexadiene derivative.

9. A process for the production of dimethyl terephthalate which comprises the step of treating a dimethyl cyclohexadiene-1,4-dicarboxylate maintained at a temperature of 50° to 300° C. by passing a gas containing free oxygen therethrough.

10. A process for the production of dimethyl terephthalate which comprises the step of treating a dimethyl cyclohexadiene-1,4-dicarboxylate maintained at a temperature of 50° to 300° C. by passing a gas containing free oxygen therethrough in the presence of an oxidation catalyst comprising a soluble salt of a metal selected from the group consisting of cobalt, manganese, iron, nickel and copper.

References Cited in the file of this patent

UNITED STATES PATENTS 2,554,484   Loder _____ May 29, 1951

FOREIGN PATENTS 738,922   Germany _____ Sept. 21, 1943

OTHER REFERENCES

Hickinbottom: "Reactions of Organic Chemistry," pp. 3, 6 to 9 (1948).